US012764803B2

(12) United States Patent
Lim et al.

(10) Patent No.: US 12,764,803 B2
(45) Date of Patent: Oct. 13, 2026

(54) SYSTEMS AND METHODS OF CLASSIFYING WIRELESS DEVICES

(71) Applicant: Meta Platforms Technologies, LLC, Menlo Park, CA (US)

(72) Inventors: Suhwan Lim, Anyang (KR); Zhu Ji, Cupertino, CA (US); Qi Qu, Redmond, WA (US); Yee Sin Chan, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 340 days.

(21) Appl. No.: 18/398,747

(22) Filed: Dec. 28, 2023

(65) Prior Publication Data

US 2024/0284523 A1 Aug. 22, 2024

Related U.S. Application Data

(60) Provisional application No. 63/446,147, filed on Feb. 16, 2023.

(51) Int. Cl.

| | |
|---|---|
| ***H04W 72/02*** | (2009.01) |
| ***H04B 7/0417*** | (2017.01) |
| ***H04W 76/10*** | (2018.01) |
| *H04B 7/06* | (2006.01) |

(52) U.S. Cl.

CPC .......... *H04W 76/10* (2018.02); *H04B 7/0417* (2013.01); *H04W 72/02* (2013.01); *H04B 7/0628* (2013.01)

(58) Field of Classification Search

CPC .............................. H04W 76/10; H04W 72/02

See application file for complete search history.

(56) References Cited

U.S. PATENT DOCUMENTS

| | | | | |
|---|---|---|---|---|
| 2020/0163144 | A1* | 5/2020 | Ryoo | H04L 47/82 |
| 2024/0073469 | A1* | 2/2024 | Phillips | G09G 5/14 |
| 2024/0252914 | A1* | 8/2024 | Yu | A63F 13/28 |

FOREIGN PATENT DOCUMENTS

| | | | |
|---|---|---|---|
| WO | WO 2023/009580 | * | 2/2023 |

* cited by examiner

*Primary Examiner* — Michael T Vu

(74) *Attorney, Agent, or Firm* — Foley & Lardner LLP

(57) ABSTRACT

Systems and methods for classifying wireless devices may include a wireless communication device which transmits a signal to a wireless communication node. The signal may indicate a device type of the wireless communication device as a two receiver extended reality (XR) device. The wireless communication device and wireless communication node may establish a connection with the wireless communication node, the connection established on a channel within a frequency band between 2.5 gigahertz (GHz) and 5 GHz, according to information of the signal.

18 Claims, 6 Drawing Sheets

SYSTEMS AND METHODS OF CLASSIFYING WIRELESS DEVICES

CROSS-REFERENCE TO RELATED APPLICATIONS

This application claims the benefit of and priority to U.S. Provisional Application No. 63/446,147, filed Feb. 16, 2023, the contents of which are incorporated herein by reference in their entirety.

FIELD OF DISCLOSURE

The present disclosure is generally related to wireless communication between devices, including but not limited to, systems and methods of classifying wireless devices.

BACKGROUND

Augmented reality (AR), virtual reality (VR), and mixed reality (MR) are becoming more prevalent, which such technology being supported across a wider variety of platforms and device. Some AR/VR/MR devices may communicate via cellular connections with various cellular equipment/cell sites/base stations.

SUMMARY

In various aspects, this disclosure is directed to systems and methods for classifying wireless communication device. According to the aspects described herein, a two receiver (2Rx) XR device (e.g., a device having two receiver antennas with two RF chains for extended reality (XR)) may be permitted to establish connections within frequency bands permitted for (e.g., limited to, exclusive to, etc.) four receiver (4Rx) (or greater than 4Rx) devices, provided that the 2Rx XR device is determined by the network to be a 2Rx XR device. In various implementations, a 2Rx XR device may signal to the network the device type of the device (e.g., the of layers for maximum-input-maximum-output (MIMO) operations, and a predetermined RFSP/SPID parameter), which indicates the device type of the 2Rx XR device. The device may signal the device type of the device to the network, to distinguish the device from legacy 2Rx devices (e.g., legacy smartphones with 2Rx, fixed wireless access devices, and so forth). Upon receiving the signal and determining the device type as a 2Rx XR device, the network may be configured to permit the device to establish a connection on certain frequencies reserved or limited to 4Rx devices, such as a frequency band between 2.5 gigahertz (GHz) and 5 GHz (e.g., n77, n78 & n79 NR operating bands).

In one aspect, this disclosure is directed to a method. The method may include transmitting, by the wireless communication device, to the wireless communication node, a signal indicating a device type of the wireless communication device as a two receiver extended reality (XR) device. The method may include establishing, by the wireless communication device, a connection with the wireless communication node, the connection established on a channel within a frequency band between 2.5 gigahertz (GHz) and 5 GHz according to information of the signal.

In some embodiments, the method includes receiving, by the wireless communication device, from the wireless communication node, traffic on the channel within the frequency band. In some embodiments, the method includes receiving, by the wireless communication device from the wireless communication node, an indication which indicates acceptance of the connection to be established on the channel within the frequency band. In some embodiments, the wireless communication device receives the indication, according to the signal indicating that the wireless communication device comprises an XR device.

In some embodiments, the signal includes device capability information indicating the device type of the wireless communication device. In some embodiments, the device capability information further includes a number of layers of multiple input multiple output (MIMO) operation. In some embodiments, the channel is selected according to a radio access technology frequency selection priority (RFSP) parameter. In some embodiments, the signal includes information corresponding to the wireless communication device accessible via a home subscriber server (HSS) or user data management (UDM). In some embodiments, the information comprises subscription data, and the wireless communication node determines that the wireless communication device is an XR device, according to the subscription data of the HSS or UDM corresponding to the wireless communication device.

In another aspect, this disclosure is directed to a wireless communication device including a wireless transceiver configured to transmit, to a wireless communication node, a signal indicating a device type of the wireless communication device as a two receiver extended reality (XR) device, and establish a connection with the wireless communication node, the connection established on a channel within a frequency band between 2.5 gigahertz (GHz) and 5 GHz, according to information of the first signal and the second signal.

In some embodiments, the wireless transceiver is further configured to receive, from the wireless communication node, traffic on the channel within the frequency band. In some embodiments, the wireless transceiver is further configured to receive, from the wireless communication node, an indication which indicates acceptance of the connection to be established on the channel within the frequency band. In some embodiments, the wireless communication device receives the indication, according to the signal indicating that the wireless communication device comprises an XR device.

In some embodiments, the signal includes device capability information indicating the device type of the wireless communication device. In some embodiments, the device capability information further includes a number of layers of multiple input multiple output (MIMO) operation. In some embodiments, the channel is selected according to a radio access technology frequency selection priority (RFSP) parameter. In some embodiments, the signal includes information corresponding to the wireless communication device accessible via a home subscriber server (HSS) or user data management (UDM). In some embodiments, the information includes subscription data, and the wireless communication node determines that the wireless communication device is an XR device, according to the subscription data of the HSS or UDM corresponding to the wireless communication device.

In another aspect, this disclosure is directed to a wireless communication node including a wireless transceiver configured to receive, from a wireless communication device, a signal indicating a device type of the wireless communication device as an extended reality (XR) device, and establish a connection with the wireless communication node, the connection established on a channel within a frequency band between 2.5 gigahertz (GHz) and 5 GHz, according to information included in the signal.

In some embodiments, the signal includes device capability information indicating at least one of the device type of the wireless communication device or a number of layers of multiple input multiple output (MIMO) operation for the wireless transceiver.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
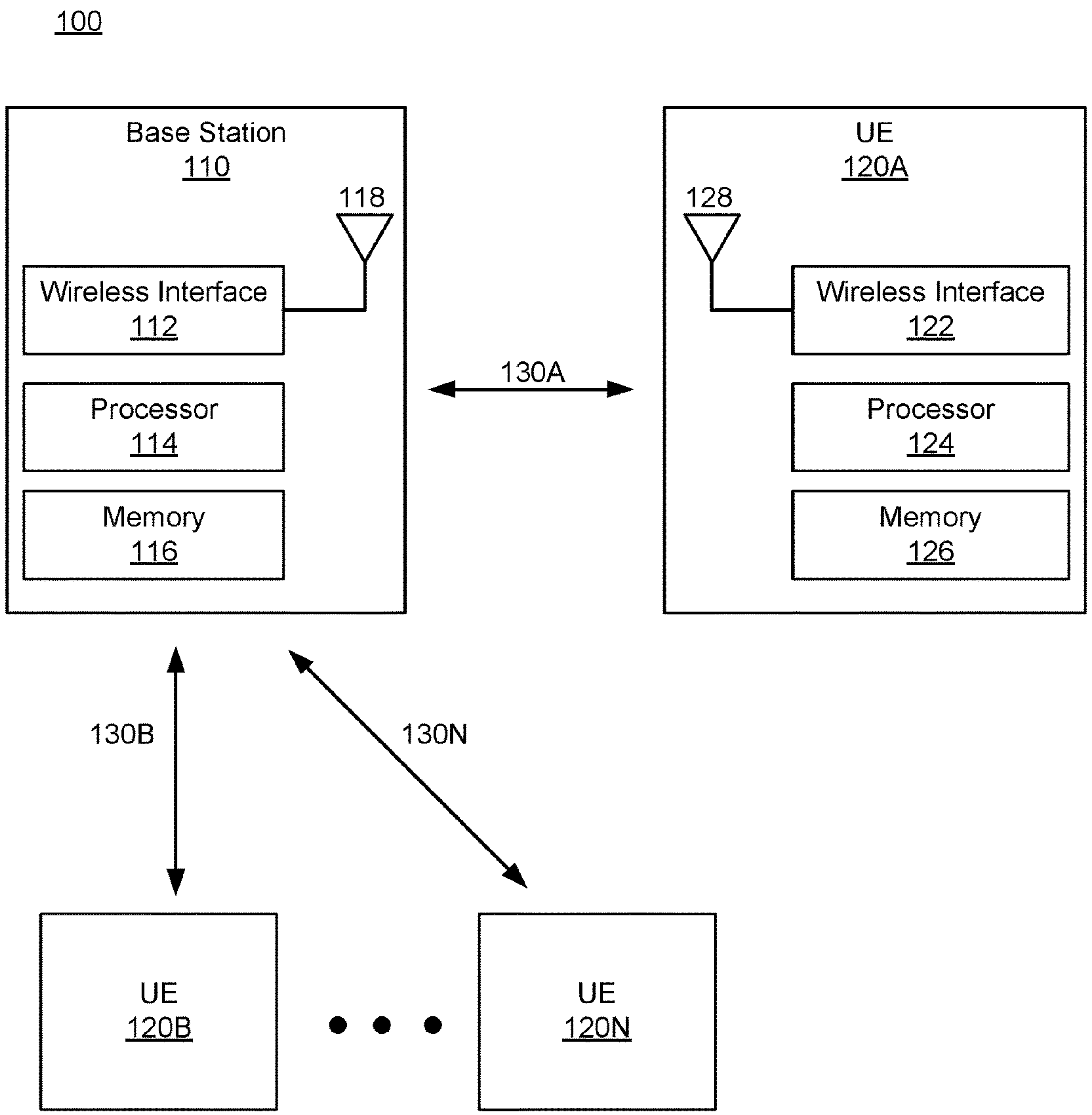
FIG. 1 is a diagram of an example wireless communication system, according to an example implementation of the present disclosure.

FIG. 1 illustrates an example wireless communication system 100. The wireless communication system 100 may include a base station 110 (also referred to as "a wireless communication node 110" or "a station 110") and one or more user equipment (UEs) 120 (also referred to as "wireless communication devices 120" or "terminal devices 120"). The base station 110 and the UEs 120 may communicate through wireless commination links 130A, 130B, 130C. The wireless communication link 130 may be a cellular communication link conforming to 3G, 4G, 5G or other cellular communication protocols or a Wi-Fi communication protocol. In one example, the wireless communication link 130 supports, employs or is based on an orthogonal frequency division multiple access (OFDMA). In one aspect, the UEs 120 are located within a geographical boundary with respect to the base station 110, and may communicate with or through the base station 110. In some embodiments, the wireless communication system 100 includes more, fewer, or different components than shown in FIG. 1. For example, the wireless communication system 100 may include one or more additional base stations 110 than shown in FIG. 1.

In some embodiments, the UE 120 may be a user device such as a mobile phone, a smart phone, a personal digital assistant (PDA), tablet, laptop computer, wearable computing device, etc. Each UE 120 may communicate with the base station 110 through a corresponding communication link 130. For example, the UE 120 may transmit data to a base station 110 through a wireless communication link 130, and receive data from the base station 110 through the wireless communication link 130. Example data may include audio data, image data, text, etc. Communication or transmission of data by the UE 120 to the base station 110 may be referred to as an uplink communication. Communication or reception of data by the UE 120 from the base station 110 may be referred to as a downlink communication. In some embodiments, the UE 120A includes a wireless interface 122, a processor 124, a memory device 126, and one or more antennas 128. These components may be embodied as hardware, software, firmware, or a combination thereof. In some embodiments, the UE 120A includes more, fewer, or different components than shown in FIG. 1. For example, the UE 120 may include an electronic display and/or an input device. For example, the UE 120 may include additional antennas 128 and wireless interfaces 122 than shown in FIG. 1.

The antenna 128 may be a component that receives a radio frequency (RF) signal and/or transmit a RF signal through a wireless medium. The RF signal may be at a frequency between 200 MHz to 100 GHz. The RF signal may have packets, symbols, or frames corresponding to data for communication. The antenna 128 may be a dipole antenna, a patch antenna, a ring antenna, or any suitable antenna for wireless communication. In one aspect, a single antenna 128 is utilized for both transmitting the RF signal and receiving the RF signal. In one aspect, different antennas 128 are utilized for transmitting the RF signal and receiving the RF signal. In one aspect, multiple antennas 128 are utilized to support multiple-in, multiple-out (MIMO) communication.

The wireless interface 122 includes or is embodied as a transceiver for transmitting and receiving RF signals through a wireless medium. The wireless interface 122 may communicate with a wireless interface 112 of the base station 110 through a wireless communication link 130A. In one configuration, the wireless interface 122 is coupled to one or more antennas 128. In one aspect, the wireless interface 122 may receive the RF signal at the RF frequency received through antenna 128, and downconvert the RF signal to a baseband frequency (e.g., 0~1 GHz). The wireless interface 122 may provide the downconverted signal to the processor 124. In one aspect, the wireless interface 122 may receive a baseband signal for transmission at a baseband frequency from the processor 124, and upconvert the baseband signal to generate a RF signal. The wireless interface 122 may transmit the RF signal through the antenna 128.

The processor 124 is a component that processes data. The processor 124 may be embodied as field programmable gate array (FPGA), application specific integrated circuit (ASIC), a logic circuit, etc. The processor 124 may obtain instructions from the memory device 126, and executes the instructions. In one aspect, the processor 124 may receive downconverted data at the baseband frequency from the wireless interface 122, and decode or process the downconverted data. For example, the processor 124 may generate audio data or image data according to the downconverted data, and present an audio indicated by the audio data and/or an image indicated by the image data to a user of the UE 120A. In one aspect, the processor 124 may generate or obtain data for transmission at the baseband frequency, and encode or process the data. For example, the processor 124 may encode or process image data or audio data at the baseband frequency, and provide the encoded or processed data to the wireless interface 122 for transmission.

The memory device 126 is a component that stores data. The memory device 126 may be embodied as random access memory (RAM), flash memory, read only memory (ROM), erasable programmable read-only memory (EPROM), electrically erasable programmable read-only memory (EEPROM), registers, a hard disk, a removable disk, a CD-ROM, or any device capable for storing data. The memory device 126 may be embodied as a non-transitory computer readable medium storing instructions executable by the processor 124 to perform various functions of the UE 120A disclosed herein. In some embodiments, the memory device 126 and the processor 124 are integrated as a single component.

In some embodiments, each of the UEs 120B . . . 120N includes similar components of the UE 120A to communicate with the base station 110. Thus, detailed description of duplicated portion thereof is omitted herein for the sake of brevity.

In some embodiments, the base station 110 may be an evolved node B (eNB), a serving eNB, a target eNB, a femto station, or a pico station. The base station 110 may be communicatively coupled to another base station 110 or other communication devices through a wireless communication link and/or a wired communication link. The base station 110 may receive data (or a RF signal) in an uplink communication from a UE 120. Additionally or alternatively, the base station 110 may provide data to another UE 120, another base station, or another communication device. Hence, the base station 110 allows communication among UEs 120 associated with the base station 110, or other UEs associated with different base stations. In some embodiments, the base station 110 includes a wireless interface 112, a processor 114, a memory device 116, and one or more antennas 118. These components may be embodied as hardware, software, firmware, or a combination thereof. In some embodiments, the base station 110 includes more, fewer, or different components than shown in FIG. 1. For example, the base station 110 may include an electronic display and/or an input device. For example, the base station 110 may include additional antennas 118 and wireless interfaces 112 than shown in FIG. 1.

The antenna 118 may be a component that receives a radio frequency (RF) signal and/or transmit a RF signal through a wireless medium. The antenna 118 may be a dipole antenna, a patch antenna, a ring antenna, or any suitable antenna for wireless communication. In one aspect, a single antenna 118 is utilized for both transmitting the RF signal and receiving the RF signal. In one aspect, different antennas 118 are utilized for transmitting the RF signal and receiving the RF signal. In one aspect, multiple antennas 118 are utilized to support multiple-in, multiple-out (MIMO) communication.

The wireless interface 112 includes or is embodied as a transceiver for transmitting and receiving RF signals through a wireless medium. The wireless interface 112 may communicate with a wireless interface 122 of the UE 120 through a wireless communication link 130. In one configuration, the wireless interface 112 is coupled to one or more antennas 118. In one aspect, the wireless interface 112 may receive the RF signal at the RF frequency received through antenna 118, and downconvert the RF signal to a baseband frequency (e.g., 0~1 GHz). The wireless interface 112 may provide the downconverted signal to the processor 124. In one aspect, the wireless interface 122 may receive a baseband signal for transmission at a baseband frequency from the processor 114, and upconvert the baseband signal to generate a RF signal. The wireless interface 112 may transmit the RF signal through the antenna 118.

The processor 114 is a component that processes data. The processor 114 may be embodied as FPGA, ASIC, a logic circuit, etc. The processor 114 may obtain instructions from the memory device 116, and executes the instructions. In one aspect, the processor 114 may receive downconverted data at the baseband frequency from the wireless interface 112, and decode or process the downconverted data. For example, the processor 114 may generate audio data or image data according to the downconverted data. In one aspect, the processor 114 may generate or obtain data for transmission at the baseband frequency, and encode or process the data. For example, the processor 114 may encode or process image data or audio data at the baseband frequency, and provide the encoded or processed data to the wireless interface 112 for transmission. In one aspect, the processor 114 may set, assign, schedule, or allocate communication resources for different UEs 120. For example, the processor 114 may set different modulation schemes, time slots, channels, frequency bands, etc. for UEs 120 to avoid interference. The processor 114 may generate data (or UL CGs) indicating configuration of communication resources, and provide the data (or UL CGs) to the wireless interface 112 for transmission to the UEs 120.

The memory device 116 is a component that stores data. The memory device 116 may be embodied as RAM, flash memory, ROM, EPROM, EEPROM, registers, a hard disk, a removable disk, a CD-ROM, or any device capable for storing data. The memory device 116 may be embodied as a non-transitory computer readable medium storing instructions executable by the processor 114 to perform various functions of the base station 110 disclosed herein. In some embodiments, the memory device 116 and the processor 114 are integrated as a single component.

In some embodiments, communication between the base station 110 and the UE 120 is based on one or more layers of Open Systems Interconnection (OSI) model. The OSI model may include layers including: a physical layer, a Medium Access Control (MAC) layer, a Radio Link Control (RLC) layer, a Packet Data Convergence Protocol (PDCP) layer, a Radio Resource Control (RRC) layer, a Non Access Stratum (NAS) layer or an Internet Protocol (IP) layer, and other layer.

Figure 2:
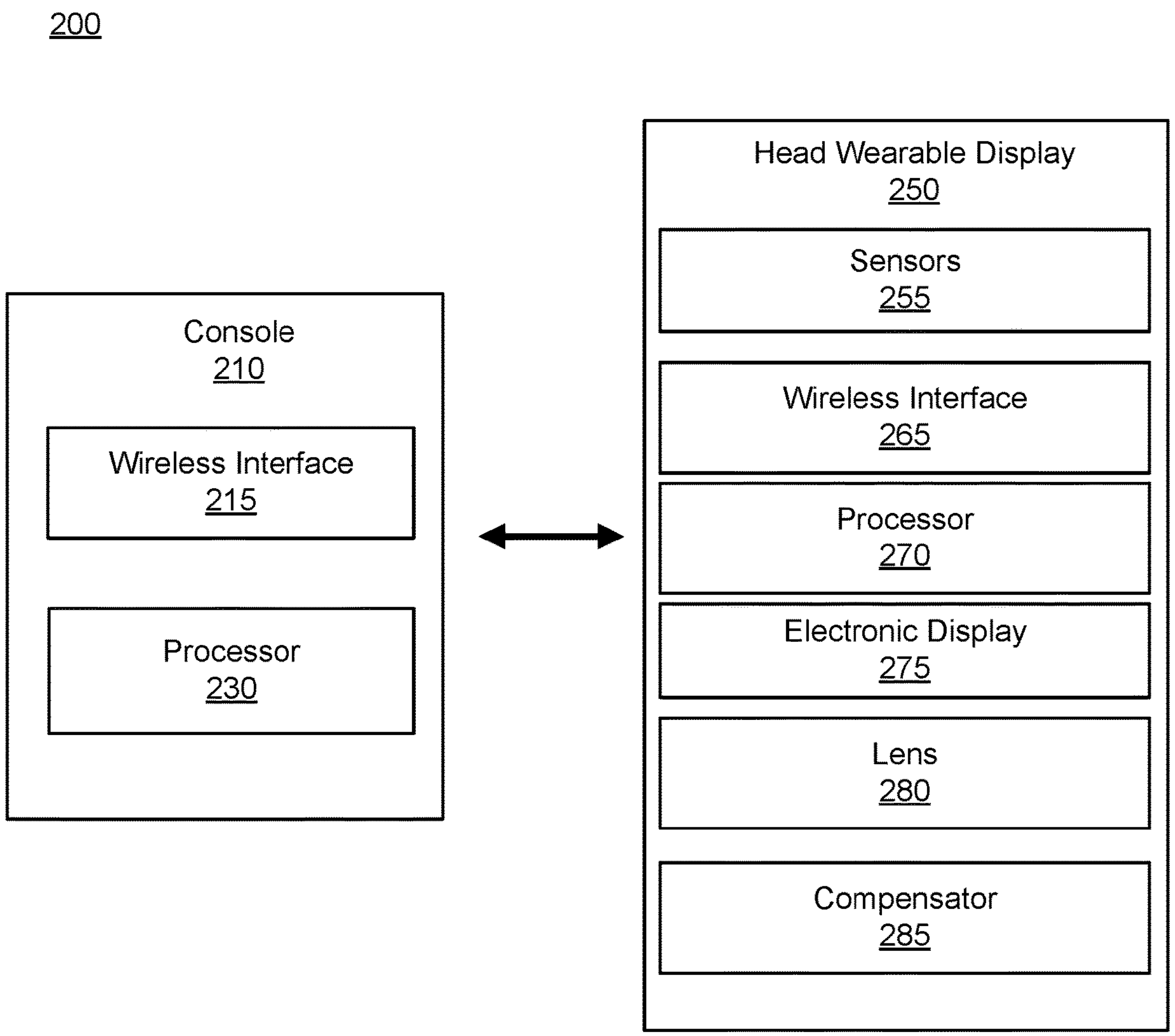
FIG. 2 is a diagram of a console and a head wearable display for presenting augmented reality or virtual reality, according to an example implementation of the present disclosure.

FIG. 2 is a block diagram of an example artificial reality system environment 200. In some embodiments, the artificial reality system environment 200 includes a HWD 250 worn by a user, and a console 210 providing content of artificial reality (e.g., augmented reality, virtual reality, mixed reality) to the HWD 250. Each of the HWD 250 and the console 210 may be a separate UE 120. The HWD 250 may be referred to as, include, or be part of a head mounted display (HMD), head mounted device (HMD), head wearable device (HWD), head worn display (HWD) or head worn device (HWD). The HWD 250 may detect its location and/or orientation of the HWD 250 as well as a shape, location, and/or an orientation of the body/hand/face of the user, and provide the detected location/or orientation of the HWD 250 and/or tracking information indicating the shape, location, and/or orientation of the body/hand/face to the console 210. The console 210 may generate image data indicating an image of the artificial reality according to the detected location and/or orientation of the HWD 250, the detected shape, location and/or orientation of the body/hand/face of the user, and/or a user input for the artificial reality, and transmit the image data to the HWD 250 for presentation. In some embodiments, the artificial reality system environment 200 includes more, fewer, or different components than shown in FIG. 2. In some embodiments, functionality of one or more components of the artificial reality system environment 200 can be distributed among the components in a different manner than is described here. For example, some of the functionality of the console 210 may be performed by the HWD 250. For example, some of the functionality of the HWD 250 may be performed by the console 210. In some embodiments, the console 210 is integrated as part of the HWD 250.

In some embodiments, the HWD 250 is an electronic component that can be worn by a user and can present or provide an artificial reality experience to the user. The HWD 250 may render one or more images, video, audio, or some combination thereof to provide the artificial reality experience to the user. In some embodiments, audio is presented via an external device (e.g., speakers and/or headphones) that receives audio information from the HWD 250, the console 210, or both, and presents audio based on the audio information. In some embodiments, the HWD 250 includes sensors 255, a wireless interface 265, a processor 270, an electronic display 275, a lens 280, and a compensator 285. These components may operate together to detect a location of the HWD 250 and a gaze direction of the user wearing the HWD 250, and render an image of a view within the artificial reality corresponding to the detected location and/or orientation of the HWD 250. In other embodiments, the HWD 250 includes more, fewer, or different components than shown in FIG. 2.

In some embodiments, the sensors 255 include electronic components or a combination of electronic components and software components that detect a location and an orientation of the HWD 250. Examples of the sensors 255 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 255 detect the translational movement and the rotational movement, and determine an orientation and location of the HWD 250. In one aspect, the sensors 255 can detect the translational movement and the rotational movement with respect to a previous orientation and location of the HWD 250, and determine a new orientation and/or location of the HWD 250 by accumulating or integrating the detected translational movement and/or the rotational movement. Assuming for an example that the HWD 250 is oriented in a direction 25 degrees from a reference direction, in response to detecting that the HWD 250 has rotated 20 degrees, the sensors 255 may determine that the HWD 250 now faces or is oriented in a direction 45 degrees from the reference direction. Assuming for another example that the HWD 250 was located two feet away from a reference point in a first direction, in response to detecting that the HWD 250 has moved three feet in a second direction, the sensors 255 may determine that the HWD 250 is now located at a vector multiplication of the two feet in the first direction and the three feet in the second direction.

In some embodiments, the sensors 255 include eye trackers. The eye trackers may include electronic components or a combination of electronic components and software components that determine a gaze direction of the user of the HWD 250. In some embodiments, the HWD 250, the console 210 or a combination of them may incorporate the gaze direction of the user of the HWD 250 to generate image data for artificial reality. In some embodiments, the eye trackers include two eye trackers, where each eye tracker captures an image of a corresponding eye and determines a gaze direction of the eye. In one example, the eye tracker determines an angular rotation of the eye, a translation of the eye, a change in the torsion of the eye, and/or a change in shape of the eye, according to the captured image of the eye, and determines the relative gaze direction with respect to the HWD 250, according to the determined angular rotation, translation and the change in the torsion of the eye. In one approach, the eye tracker may shine or project a predetermined reference or structured pattern on a portion of the eye, and capture an image of the eye to analyze the pattern projected on the portion of the eye to determine a relative gaze direction of the eye with respect to the HWD 250. In some embodiments, the eye trackers incorporate the orientation of the HWD 250 and the relative gaze direction with respect to the HWD 250 to determine a gate direction of the user. Assuming for an example that the HWD 250 is oriented at a direction 30 degrees from a reference direction, and the relative gaze direction of the HWD 250 is-10 degrees (or 350 degrees) with respect to the HWD 250, the eye trackers may determine that the gaze direction of the user is 20 degrees from the reference direction. In some embodiments, a user of the HWD 250 can configure the HWD 250 (e.g., via user settings) to enable or disable the eye trackers. In some embodiments, a user of the HWD 250 is prompted to enable or disable the eye trackers.

In some embodiments, the wireless interface 265 includes an electronic component or a combination of an electronic component and a software component that communicates with the console 210. The wireless interface 265 may be or correspond to the wireless interface 122. The wireless interface 265 may communicate with a wireless interface 215 of the console 210 through a wireless communication link through the base station 110. Through the communication link, the wireless interface 265 may transmit to the console 210 data indicating the determined location and/or orientation of the HWD 250, and/or the determined gaze direction of the user. Moreover, through the communication link, the wireless interface 265 may receive from the console 210 image data indicating or corresponding to an image to be rendered and additional data associated with the image.

In some embodiments, the processor 270 includes an electronic component or a combination of an electronic component and a software component that generates one or more images for display, for example, according to a change in view of the space of the artificial reality. In some embodiments, the processor 270 is implemented as a part of the processor 124 or is communicatively coupled to the processor 124. In some embodiments, the processor 270 is implemented as a processor (or a graphical processing unit (GPU)) that executes instructions to perform various functions described herein. The processor 270 may receive, through the wireless interface 265, image data describing an image of artificial reality to be rendered and additional data associated with the image, and render the image to display through the electronic display 275. In some embodiments, the image data from the console 210 may be encoded, and the processor 270 may decode the image data to render the image. In some embodiments, the processor 270 receives, from the console 210 in additional data, object information indicating virtual objects in the artificial reality space and depth information indicating depth (or distances from the HWD 250) of the virtual objects. In one aspect, according to the image of the artificial reality, object information, depth information from the console 210, and/or updated sensor measurements from the sensors 255, the processor 270 may perform shading, reprojection, and/or blending to update the image of the artificial reality to correspond to the updated location and/or orientation of the HWD 250. Assuming that a user rotated his head after the initial sensor measurements, rather than recreating the entire image responsive to the updated sensor measurements, the processor 270 may generate a small portion (e.g., 10%) of an image corresponding to an updated view within the artificial reality according to the updated sensor measurements, and append the portion to the image in the image data from the console 210 through reprojection. The processor 270 may perform shading and/or blending on the appended edges. Hence, without recreating the image of the artificial reality according to the updated sensor measurements, the processor 270 can generate the image of the artificial reality.

In some embodiments, the electronic display 275 is an electronic component that displays an image. The electronic display 275 may, for example, be a liquid crystal display or an organic light emitting diode display. The electronic display 275 may be a transparent display that allows the user to see through. In some embodiments, when the HWD 250 is worn by a user, the electronic display 275 is located proximate (e.g., less than 3 inches) to the user's eyes. In one aspect, the electronic display 275 emits or projects light towards the user's eyes according to image generated by the processor 270.

In some embodiments, the lens 280 is a mechanical component that alters received light from the electronic display 275. The lens 280 may magnify the light from the electronic display 275, and correct for optical error associated with the light. The lens 280 may be a Fresnel lens, a convex lens, a concave lens, a filter, or any suitable optical component that alters the light from the electronic display 275. Through the lens 280, light from the electronic display 275 can reach the pupils, such that the user can see the image displayed by the electronic display 275, despite the close proximity of the electronic display 275 to the eyes.

In some embodiments, the compensator 285 includes an electronic component or a combination of an electronic component and a software component that performs compensation to compensate for any distortions or aberrations. In one aspect, the lens 280 introduces optical aberrations such as a chromatic aberration, a pin-cushion distortion, barrel distortion, etc. The compensator 285 may determine a compensation (e.g., predistortion) to apply to the image to be rendered from the processor 270 to compensate for the distortions caused by the lens 280, and apply the determined compensation to the image from the processor 270. The compensator 285 may provide the predistorted image to the electronic display 275.

In some embodiments, the console 210 is an electronic component or a combination of an electronic component and a software component that provides content to be rendered to the HWD 250. In one aspect, the console 210 includes a wireless interface 215 and a processor 230. These components may operate together to determine a view (e.g., a FOV of the user) of the artificial reality corresponding to the location of the HWD 250 and the gaze direction of the user of the HWD 250, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the HWD 250 in a physical space into a virtual space (or simultaneous localization and mapping (SLAM) data), eye tracking data, motion vector information, depth information, edge information, object information, etc. The console 210 may provide the image data and the additional data to the HWD 250 for presentation of the artificial reality. In other embodiments, the console 210 includes more, fewer, or different components than shown in FIG. 2. In some embodiments, the console 210 is integrated as part of the HWD 250.

In some embodiments, the wireless interface 215 is an electronic component or a combination of an electronic component and a software component that communicates with the HWD 250. The wireless interface 215 may be or correspond to the wireless interface 122. The wireless interface 215 may be a counterpart component to the wireless interface 265 to communicate through a communication link (e.g., wireless communication link). Through the communication link, the wireless interface 215 may receive from the HWD 250 data indicating the determined location and/or orientation of the HWD 250, and/or the determined gaze direction of the user. Moreover, through the communication link, the wireless interface 215 may transmit to the HWD 250 image data describing an image to be rendered and additional data associated with the image of the artificial reality.

The processor 230 can include or correspond to a component that generates content to be rendered according to the location and/or orientation of the HWD 250. In some embodiments, the processor 230 is implemented as a part of the processor 124 or is communicatively coupled to the processor 124. In some embodiments, the processor 230 may incorporate the gaze direction of the user of the HWD 250. In one aspect, the processor 230 determines a view of the artificial reality according to the location and/or orientation of the HWD 250. For example, the processor 230 maps the location of the HWD 250 in a physical space to a location within an artificial reality space, and determines a view of the artificial reality space along a direction corresponding to the mapped orientation from the mapped location in the artificial reality space. The processor 230 may generate image data describing an image of the determined view of the artificial reality space, and transmit the image data to the HWD 250 through the wireless interface 215. In some embodiments, the processor 230 may generate additional data including motion vector information, depth information, edge information, object information, hand model data, etc., associated with the image, and transmit the additional data together with the image data to the HWD 250 through the wireless interface 215. The processor 230 may encode the image data describing the image, and can transmit the encoded data to the HWD 250. In some embodiments, the processor 230 generates and provides the image data to the HWD 250 periodically (e.g., every 11 ms).

In one aspect, the process of detecting the location of the HWD 250 and the gaze direction of the user wearing the HWD 250, and rendering the image to the user should be performed within a frame time (e.g., 11 ms or 16 ms). A latency between a movement of the user wearing the HWD 250 and an image displayed corresponding to the user movement can cause judder, which may result in motion sickness and can degrade the user experience. In one aspect, the HWD 250 and the console 210 can prioritize communication for AR/VR, such that the latency between the movement of the user wearing the HWD 250 and the image displayed corresponding to the user movement can be presented within the frame time (e.g., 11 ms or 16 ms) to provide a seamless experience.

Figure 3:
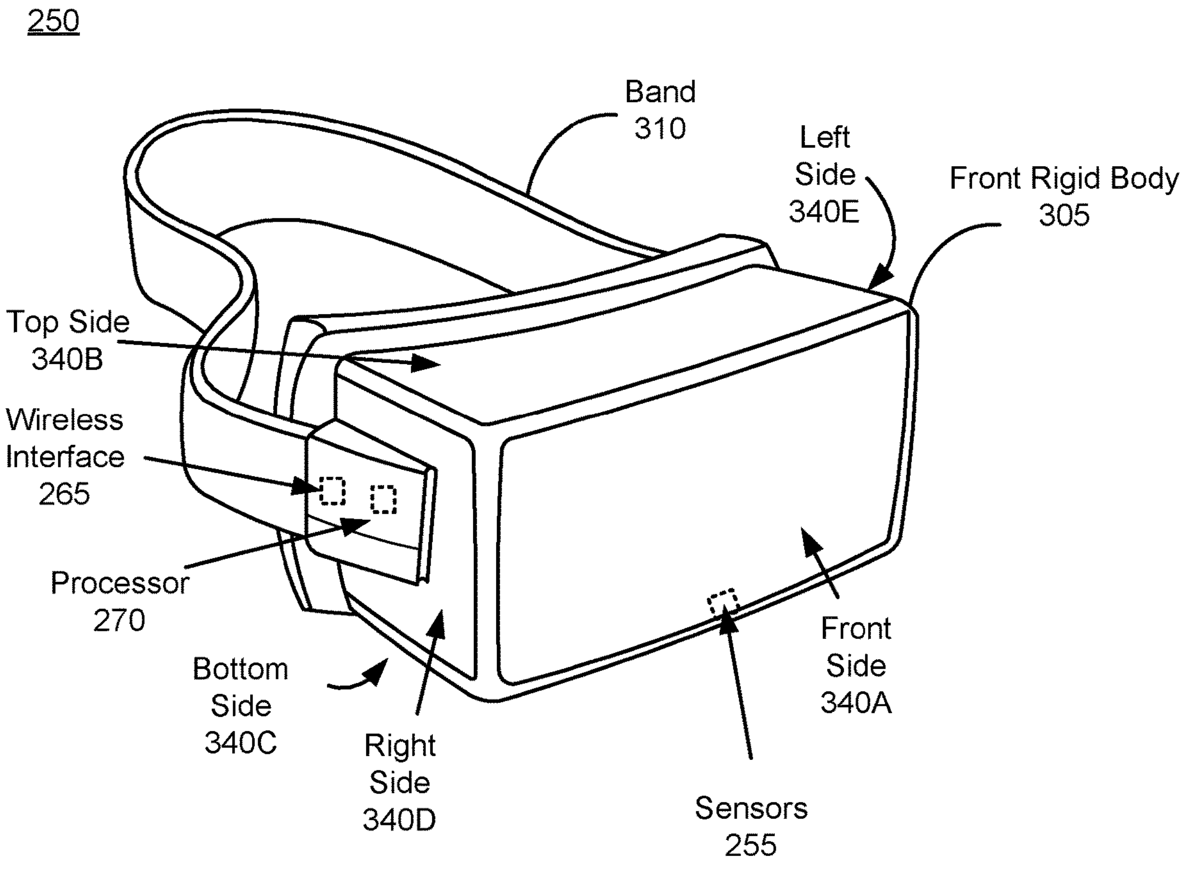
FIG. 3 is a diagram of a head wearable display, according to an example implementation of the present disclosure.

FIG. 3 is a diagram of a HWD 250, in accordance with an example embodiment. In some embodiments, the HWD 250 includes a front rigid body 305 and a band 310. The front rigid body 305 includes the electronic display 275 (not shown in FIG. 3), the lens 280 (not shown in FIG. 3), the sensors 255, the wireless interface 265, and the processor 270. In the embodiment shown by FIG. 3, the wireless interface 265, the processor 270, and the sensors 255 are located within the front rigid body 205, and may not be visible externally. In other embodiments, the HWD 250 has a different configuration than shown in FIG. 3. For example, the wireless interface 265, the processor 270, and/or the sensors 255 may be in different locations than shown in FIG. 3.

Figure 4:
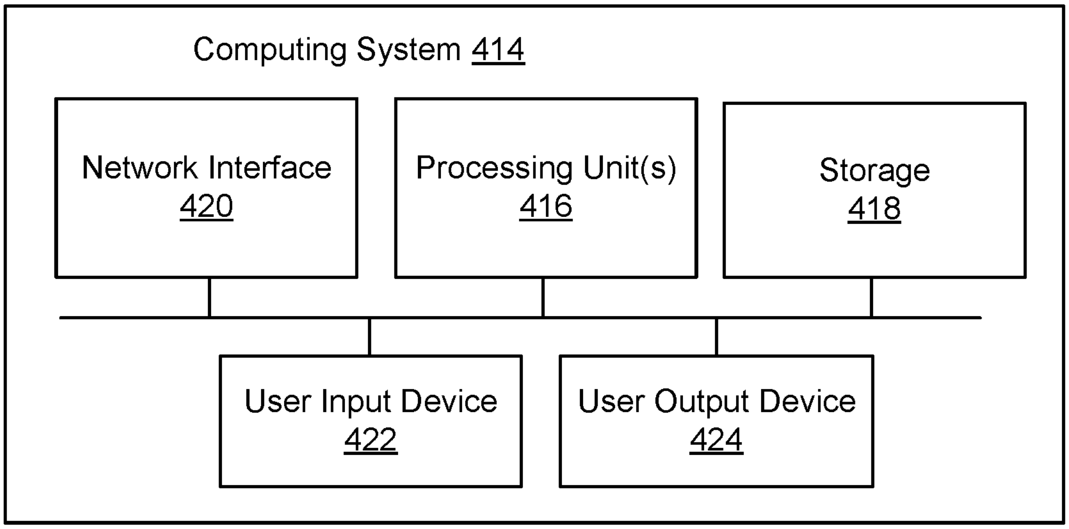
FIG. 4 is a block diagram of a computing environment according to an example implementation of the present disclosure.

Various operations described herein can be implemented on computer systems. FIG. 4 shows a block diagram of a representative computing system 414 usable to implement the present disclosure. In some embodiments, the source devices 110, the sink device 120, the console 210, the HWD 250 are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 420 may include a transceiver to allow the computing system 414 to transmit and receive data from a remote device using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 416. Similarly, a receiver may be configured to receive frames, slots or symbols and the processor unit 416 may be configured to process the frames. For example, the processor unit 416 can be configured to determine a type of frame and to process the frame and/or fields of the frame accordingly.

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 5:
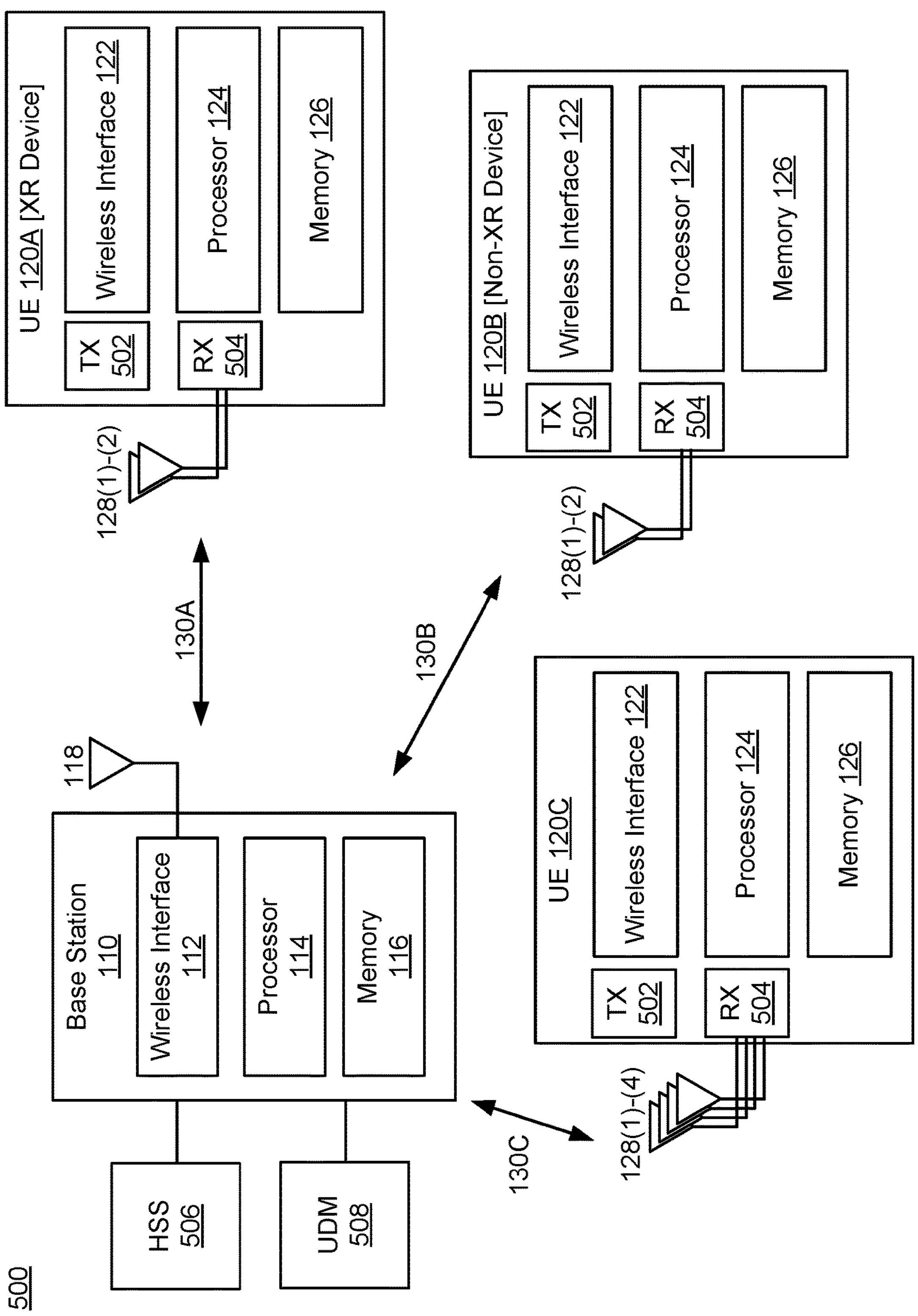
FIG. 5 is a block diagram of a system for classifying wireless devices, according to an example implementation of the present disclosure.
Figure 6:
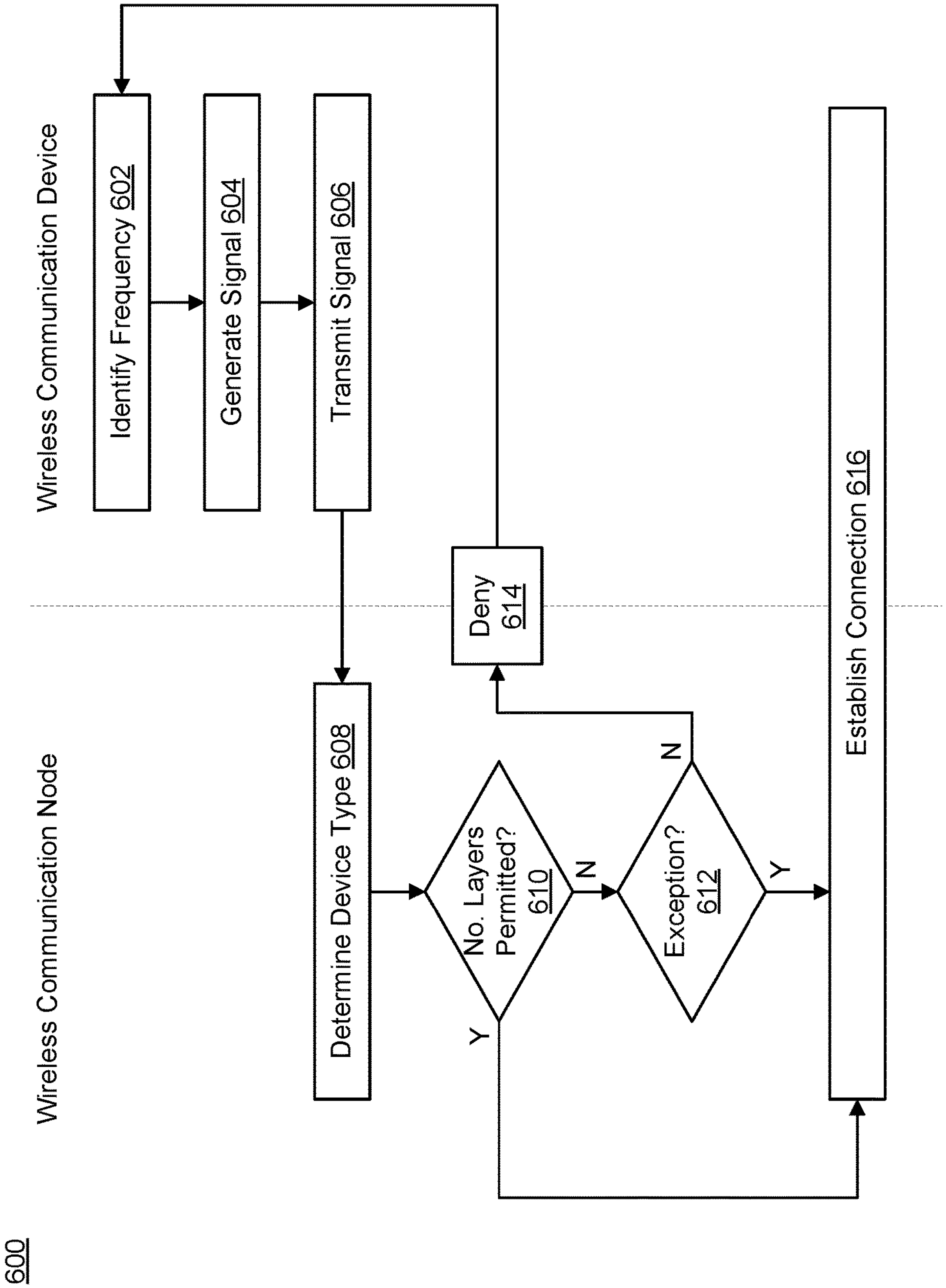
FIG. 6 is a flowchart showing an example method of classifying wireless devices, according to an example implementation of the present disclosure.

Referring now to FIG. 5-FIG. 6, this disclosure is directed to systems and methods of classifying wireless devices. Some cellular standards (such as 3GPP) may define some specific device types in certain frequency ranges set by certain standards, such as 3GPP. The frequency ranges may include, for example, FR1: e.g., up to 7.125 GHz, FR2: e.g., 24.25~71 GHz frequency range). Some devices, such as AR/VR/XR devices, may have different radio frequency (RF) requirements as compared to other devices which operate in FR1 or FR2. According to the systems and methods described herein, a user equipment (UE) vendor may certify for a particular device type. The UE may provide certain signaling for the number of multiple-input multiple-output (MIMO) layer, to distinguish between 2Rx and 4Rx UE device types. Also, the UE may signal (e.g., using a radio access technology (RAT) frequency selection priority RSRP, service profiling ID (SPID), etc.) a specific device type parameter to a radio access network (RAN) to distinguish the different device types among variable devices in real field. The UE may transmit the parameter to an access management function (AMF) of the RAN. In some embodiments, the AMF may request additional details or information (which may be the same as or similar to the parameter) regarding the UE from a home subscriber server (HSS), and/or unified data management (UDM). The AMF can use the parameter/device information to determine the device type of the UE. As a result, the RAN can optimize the related RF requirements for the UE based on the device type of the UE. For example, the RAN can permit the exception to the XR device UE, to establish a connection with two-receiver antennas device types in NR operating bands, such as which FR1 NR bands, which are specified to support with 4RX antennas, based on the RFSP/SPID parameters (or information from the HSS/UDM of subscribe networks) indicating or identifying the UE as an XR device (despite the UE having two MIMO layers).

Referring specifically to FIG. 5, depicted is a block diagram of a system 500 of classifying wireless devices, according to an example implementation of the present disclosure. The system 500 may include a base station 110 and a plurality of UEs 120A-120C. The base station 110 may be similar to the base station 110 of FIG. 1, and the UEs 120A-120C (generally referred to as "UE 120") may be similar to the UEs 120 of FIG. 1. The base station and UEs 110, 120 may include respective wireless interfaces 112, 122, processors 114, 124, and memory 116, 126. The wireless interfaces 112, 122, processors 114, 124, and memory 116, 126 may be similar to the corresponding hardware described above with reference to FIG. 1.

In various embodiments and instances, some UEs 120 may be extended reality (XR) devices, while other UEs 120 may be non-XR devices. Additionally, some UEs 120 may include or support two layers for multiple-input-multiple-output (MIMO) operation (generally referred to as MIMO layers), while other UEs 120 may include four MIMO layers. As described in greater detail below, an XR device with small volume form factor having two MIMO layers (such as UE 120A shown in the example of FIG. 5), may be configured to transmit, indicate, or otherwise provide information relating to the device type of the UE 120A to the base station 110. The base station 110 may be configured to determine the device type of the UE 120A, based on the subscribed information in RFSP/SPID or HSS/UDM parameters from the UE 120A. The base station 110 and the UE 120A may be configured to establish a connection on certain channels according to the device type of the UE 120A.

As shown in FIG. 5, the UEs 120 may include one or more XR devices. XR devices may be or include any device, component, or equipment designed or configured to provide or supply an extended reality environment or human-machine interaction. For example, extended reality may be defined to include any type of reality including any and all real-and-virtual combined environments and human-machine interactions generated by computer technology and wearables. Extended reality may include, for instance, augmented reality, mixed reality, and virtual reality. The UEs 120 may include XR devices by including corresponding hardware designed to support such extended reality environments (including, for instance, displays, I/Os, sensors, cameras, etc.). Example UEs 120 which may include or support extended reality may include, for instance, the HWD 250, smart glasses, or any other wearable devices.

Some UEs 120 may support multiple-input-multiple-output (MIMO) operation to improve space and frequency diversity gain and/or enhance the capability of transmission by spatial multiplexing technology. MIMO devices may be or include devices which use or include multiple antennas 128 (e.g., at the transmitter 502 and receiver 504), for purposes of improving communication performance. The number of MIMO layers may refer to the number of independent channels or streams of data that can be transmitted and received simultaneously. In other words, each layer may represent a separate stream of data which is spatially multiplexed from other streams of data. The number of MIMO layers may be dependent on the number of antennas 128 included or incorporated in the UE 120, which may itself depend on the form factor of the UE 120. For example, smaller devices (such as wearable devices, reduced capability devices, or XR devices) may have smaller form factors and may thus include one or two MIMO layers (such as UE 120A and UE 120B). Similarly, larger devices (such as smartphones, FWA (fixed wireless access) devices, etc.) may have larger form factors and may thus include four (or more) MIMO layers (such as UE 120C). However, some legacy devices (such as legacy smartphones, legacy FWA devices, etc.) may have larger form factors, but may still have or support two MIMO layers (such as UE 120B).

Prior to deployment, UEs 120 may undergo various testing and certification for purposes of standards compliance testing. For example, UEs 120 may be tested to differentiate two receiver XR devices from other device types by the manufacturer. Such testing may include, for example, radio resource management (RRM) core/performance testing, radio frequency (RF) testing, MIMO demodulation testing, and so forth. Responsive to successful testing, the manufacturer of the UEs 120 may register the UEs 120 within cellular networks 110 in a certain NR carriers, which may include submitting corresponding information indicating successful testing and certification of device type. The cellular operator(s) (or a different entity) may assign each UE 120 a unique identifier (such as an international mobile equipment identity (IMEI)) identifier or number, indicating that the UE 120 is a certified and legitimate device.

For the two receiver (2Rx) XR devices, the systems and methods described herein may implement or provide exceptions for two receiver (4Rx) radio frequency (RF) requirement tests in certain new radio (NR) bands, such as n41, n77, n78, n79, and so forth). Such exceptions may be or include, for instance, reference sensitivity (REFSENS) requirements for 4Rx devices, or other reception radio frequency tests of devices with 4Rx antennas. In some embodiments, if a 2Rx XR device provides exception capabilities of 4Rx supporting in a certain NR bands defined to support 4Rx antennas, then the 2Rx XR device can skip the 4Rx receiver RF performance requirements based on or according to the device's declaration for certification aspects e.g., for global certification forum (GCF) and/or PCS type certification review board (PTCRB) testing and certification.

According to the systems and methods described in greater detail below, certain channel permissions may be relaxed by the base station 110 for two receiver XR devices, whereas such permissions may be enforced for other device types. For example, the base station 110 may prohibit connections on channels for 2Rx XR device within certain frequency bands (such as FR1 frequency band, or more specifically between 2.5 and below 5 GHz), based on device type indication and corresponding information (e.g., the number of MIMO layers of devices). However, and as described in greater detail below, the base station 110 may permit connections on channels within those certain frequency bands, responsive to the UE 120 (e.g., UE 120A) being indicated as an XR device type by RFSP/SPID for registration and information of the number of MIMO layers in a certain 4RX mandatory NR operating bands. For example, the base station 110 may permit connections by certain XR devices 120 (such as UE 120A) on channels within the frequency bands, responsive to determining that the UE 120 is a two MIMO layer XR device. However, other devices (such as legacy smart phone type devices or other devices) with 2Rx receivers may be prohibited in NR system.

When a UE 120 attempts to establish a connection 130 with a base station 110, the UE 120 may be configured to determine, identify, or otherwise select a frequency band and cell of the base station 110 in which to establish the connection 130. The UE 120 may be configured to select the frequency band by NR absolute radio-frequency channel number (ARFCN) searching and cell of the base station 110, responsive to performing a RACH process to initial access based on the measurements of available reference signals and according to various parameters or metrics corresponding to the measurements (e.g., signal strength, quality, frequency selection priorities, etc.). In some instances, the UE 120 may be configured to select a frequency band within FR1 (e.g., sub-6 GHz spectrum, or up to 7.125 GHz).

In some embodiments, the UE 120 may be configured to select a frequency band based on, using, or according to a radio access technology (RAT) frequency selection priority (RFSP) based on previous user information in the cellular (e.g., 5G) system. For example, the RFSP may define frequency selection priorities for the UE 120 to use when establishing a connection with the base station 110, including preferred frequencies or frequency bands. The RFSP may be stored or otherwise configured on the UE 120 (e.g., locally, for instance in memory or on a SIM card of the UE 120).

Responsive to selecting the frequency band and cell, the UE 120 may be configured to perform a random access channel (RACH) process to initiate the connection with the base station 110 on the intended frequency band and cell. The RACH process may generally include the UE 120 sending a RACH request to, and receiving a random access response (RAR) from, the base station 110. The RAR may include resource information, timing advance information for synchronization, etc.

The UE 120 may be configured to generate, establish, or otherwise provide a signal for transmission to the base station 110, to establish a connection on the frequency band and cell. In some embodiments, the signal may include a channel access request signal. The channel access request signal may include, for example, identity information corresponding to the UE 120, an indication of a purpose or reason for the connection, and so forth. The UE 120 may be configured to communicate, transmit, send, or otherwise provide the signal (e.g., the channel access request signal) to the base station 110.

In some embodiments, the UE 120 may be configured to transmit, send, or otherwise provide a signal including device capability information of the UE 120 to the base station 110. The UE 120 may be configured to provide the capability information together with the connection request (e.g., in the same or different signals). The capability information may include, for example, information regarding the UE 120 including, but not limited to, supported radio access technologies (RATs), supported NR/LTE frequency bands or band combinations, uplink/downlink MIMO configurations, and/or other information which indicates or otherwise identifies capabilities of the UE 120. The capability information may be included in an information element of the UE 120, such as UECapabilityInformation-IE. In various implementations, the UE device type may not be defined in the UECapabilityInformation-IEs in certain previous iterations of cellular standards (such as FR1 Rel-18 Specification). However, the systems and methods described herein can define the specific device type in specification and capability signaling. In some embodiments, and as described herein, an XR device type can be declared for the UE certification test(s), to identify the XR device type UE with legacy system. In other words, solutions are presented herein to distinguish the XR device type among legacy NR devices, to allow the exception of 4Rx antennas of XR device type to access certain cellular bands within the cellular (e.g., 5G) system.

The base station 110 may be configured to determine, detect, or otherwise identify the device type of the UE 120 based on or according to the capability information. For example, and in some embodiments, the base station 110 may be configured to identify the device type as an XR device, based on a predetermined value (SPID/RFSP) included in the device type field of the capability information indicating that the UE 120 is a two receiver XR device. The UE 120 may be configured to provide the predetermined value in the device type field and 2Rx capability information responsive to the testing and certification processes as described above, provided that the UE 120 satisfies the "XR device" as set forth in various cellular standards (such as the example definition provided above). In some embodiments, the base station 110 may be configured to identify the device type of the UE 120, based on a combination of values provided in the capability information. For example, the capability information may include a value indicating a MIMO configuration of two receivers, and a predetermined value (SPID/RFSP) indicating a device type of an XR device. In this example, based on the values included in the capability information, the base station 110 may be configured to determine that the UE 120 is a two receiver XR device.

In some embodiments, the connection request signal and/or capability information signal may include a service profiling identifier (SPID) parameter of the UE 120. The SPID may be or include a value which defines the service profile of the UE 120, including which network services or features the UE 120 is permitted or entitled to use. The SPID may indicate that the UE 120 is permitted to access certain services (such as voice/data), specific QoS levels, camping on certain cells or frequency bands, and/or access to certain features. In some embodiments, the SPID parameter may also indicate or otherwise identify the device type of the UE 120. For example, the UE 120 may be hardcoded or otherwise provided with a corresponding SPID, which is uniquely associated with the particular device type.

The base station 110 may be configured to determine the device type based on information retrieved or otherwise accessed via the home subscriber server (HSS) 506 and/or unified data management (UDM) 508 in connection with the SPID. For example, the HSS 506 (for LTE) and UDM 508 (for 5G) may include or store information on subscriber profiles (including for instance, device type), and service entitlements indicated by the corresponding SPID. The base station 110 may be configured to retrieve or otherwise access the HSS 506 and/or UDM 508, and can retrieve the profile corresponding to the UE 120 using the SPID from the UE 120. The base station 110 may be configured to determine the device type based on or according to information identified in the profile.

The base station 110 may be configured to accept or deny the request corresponding to the signal, based on or according to the device type of the UE 120. In some embodiments, the base station 110 may be configured to apply one or more policies or rules (e.g., camping or frequency band rules) for certain device types. For example, and as mentioned above, such policies or rules may prohibit connections being established on channels within certain frequency bands (such as FR1, or sub-7.125 GHz, or between 2.5 and below 5 GHz), for device types having a two receiver MIMO configuration. However, such policies or rules may have an exception to permit connections being established on channels within the certain frequency bands, for device types having a two receiver MIMO configuration, provided the device type is an XR device.

The base station 110 may be configured to apply the policy or rules to the UE 120 and requested connection on the corresponding channel, to determine whether to permit or deny the connection on the requested channel. For example, the base station 110 may be configured to determine whether the device type of the UE 120 satisfies the one or more policies or rules (or other criterion), to permit or deny the connection. For instance, where the base station 110 determines that the UE 120 is a two-receiver XR device (as is the case with UE 120A), the base station 110 may be configured to permit/allow/establish the connection on the corresponding channel. As another example, where the base station 110 determines that the UE 120 is a four-receiver (or N+4-receiver) device, as is the case with UE 120C, the base station 110 may be configured to permit/allow/establish the connection on the corresponding channel. On the other hand, where the base station determines that the UE 120 is a two-receiver device, but is not an XR device (the case with UE 120B as a legacy smart phone type UE), the base station 110 may be configured to block/terminate/reject/deny the connection on the corresponding channel.

Referring now to FIG. 6, depicted is a flow chart showing an example method 600 of classifying wireless devices, according to an example implementation of the present disclosure. The method 600 may be performed by the devices, components, elements, or hardware described above with reference to FIG. 1-FIG. 5, such as the wireless communication device (or UE 120), and/or wireless communication node (or base station 110). As a brief overview, at step 602, a wireless communication device may identify a frequency. At step 604, the wireless communication device may generate a signal. At step 606, the wireless communication device may transmit the signal. At step 608, the wireless communication node may determine a device type of the wireless communication device. At step 610, the wireless communication node may determine if a device having the number of layers is permitted to establish a connection on the identified frequency. At step 612, the wireless communication node may determine if any exceptions apply. At step 614, the wireless communication node may deny the connection. At step 616, the wireless communication node and wireless communication device may establish the connection.

At step 602, a wireless communication device may identify a frequency/band. In some embodiments, the wireless communication device may perform a scan of frequencies in a service area or use the previous information in the registration area of a base station, to identify a frequency. For example, the wireless communication device may perform a scan of available radio signals in ARNFCN, and can select a corresponding radio access technology (RAT) based on the device's capabilities and priorities. The wireless communication device may perform the scan responsive to the device being powered on, responsive to the antenna being activated (e.g., from an "off" state or mode, such as an airplane mode), and so forth. In some embodiments, the wireless communication device may identify the frequency/band responsive to switching or moving to a new service area of a new base station (e.g., as part of handover).

The wireless communication device may identify a frequency within a frequency band. The frequency band may be, for example, FR1 frequency band (or frequencies below 7.125 GHz). In some embodiments, the frequency band may be between 2.5 and below 5 GHz. The wireless communication device may identify a frequency of a channel within the frequency band. The wireless communication device may identify or select the frequency within the frequency band according to various priority settings or configurations, such as a RAT frequency selection priority (RFSP) parameter set or defined at the wireless communication device. For example, the wireless communication device may be preconfigured with certain RFSP parameters for selecting frequencies and frequency bands.

At step 604, the wireless communication device may generate a signal. In some embodiments, the wireless communication device may generate a signal to establish a connection on the channel corresponding to the identified frequency/band. The wireless communication device may generate the signal, to establish the connection on the selected channel. The wireless communication device may generate the signal following a random access channel (RACH) procedure with the base station. In some embodiments, the signal may be or include one or more (e.g., one or a plurality of) signals.

In some embodiments, the wireless communication device my generate the signal(s) to include information indicating the device type. The wireless communication device may generate the signal(s) to identify or otherwise indicate the device type, in capability information included or encoded in the signal. For example, the wireless communication device may generate the signal to include the capability information of the wireless communication device. The capability information may be included in the connection request signal, or may be sent in a signal separate from the connection request signal. The capability information may include various information indicative of the device type. For example, the capability information may include a device type field for indicating the device type, a MIMO configuration field for indicating a number of MIMO layers of the device, and so forth. The wireless communication device may generate the signal(s) to indicate the device type to the base station.

In some embodiments, the wireless communication device may generate the signal(s) to include subscription data. For example, the wireless communication device may generate the signals to indicate or otherwise identify a subscriber profile corresponding the wireless communication device. The wireless communication device may generate the signals to identify the subscriber profile, by including or otherwise incorporating a service profiling identifier (SPID) parameter in the signal. The wireless communication device can generate the signal, to indicate or otherwise identify the SPID parameter used to identify the subscriber profile corresponding to the wireless communication device.

The SPID parameter may be included in the capability information, or in some other information/field/packet/message sent from the wireless communication device to the wireless communication node.

At step 606, the wireless communication device may transmit the signal. In some embodiments, the wireless communication device may communicate, send, or otherwise transmit, to the wireless communication node, the signal indicating a device type of the wireless communication device. In some instances (e.g., for certain devices), the device type may be a two receiver extended reality (XR) device. In other words, the wireless communication device may transmit the signal to the wireless communication node, which indicates the wireless communication device has a device type of a two receiver XR device (or 2RX XR device). The wireless communication device may transmit the signal on the channel corresponding to the frequency identified and subscribed information at step 602. In some embodiments, an XR UE may only send number of MIMO layer as capability signaling, and the SPID/RFSP information may be considered to determine the UE device type in step 608.

At step 608, the wireless communication node may determine a device type of the wireless communication device. In some embodiments, the wireless communication node may determine the device type of the wireless communication device, responsive to receiving the signal transmitted by the wireless communication device at step 606. The wireless communication device may determine the device type based on or according to information encoded or otherwise included in the signal. For example, the wireless communication node may determine the device type based on values included in fields of the capability information, based on the SPID parameter, and so forth.

The wireless communication node may determine the device type based on values for fields included in the capability information of the signal. For example, as mentioned above, the capability information may include fields corresponding to a device type and a MIMO configuration. The wireless communication node may parse the signal received from the wireless communication device, to extract or otherwise identify values included in the fields corresponding to the device type and MIMO configuration. The wireless communication node may determine the device type as an XR device, based on the value included in the corresponding field for the device type. The wireless communication node may determine the device type as a two receiver XR device, based on the value indicated in the corresponding field for the MIMO configuration.

In some embodiments, the wireless communication node determines the device type according to a SPID parameter included in the signal. For example, the wireless communication node may determine the device type by cross-referencing the SPID parameter included in the signal against information included in the HSS or UDM. The wireless communication node may use the SPID parameter from the signal, to retrieve or otherwise access a subscriber profile corresponding to the SPID parameter from the HSS or UDM. The wireless communication node may determine the device type for the wireless communication device, based on or according to the information included in the subscriber profile.

At step 610, the wireless communication node may determine if a device having the number of (e.g., MIMO) layers is permitted to establish a connection on the identified frequency. In some embodiments, the wireless communication node may apply one or more policies or rules to features of the device identified (e.g., from the configuration/capability information and/or the subscriber profile), to determine whether the MIMO configuration of the device satisfies a connection criteria for the channel. For example, the wireless communication node may generally prohibit connections on channels within certain frequencies which were defined as 4Rx mandatory NR operating bands, between the wireless communication node and a wireless communication device having a two receiver MIMO configuration. Conversely, the wireless communication node may permit connections on channels within those certain frequencies, between the wireless communication node and a wireless communication device having a four (or greater than four) MIMO configuration. The wireless communication node may apply the one or more policies to the MIMO configuration of the device, to determine whether the device is permitted (or excluded) from establishing a connection on the channel within the requested frequency.

Where, at step 610, the wireless communication node determines the wireless communication device is permitted to establish a connection on the channel within the requested frequency, the method 600 may proceed to step 616. Where, at step 610, the wireless communication node determines the wireless communication device is excluded (or prohibited) from establishing a connection on the channel within the requested frequency, the method 600 may proceed to step 612.

At step 612, the wireless communication node may determine if any exceptions apply. For example, the wireless communication node may determine if any exceptions to the policy (or policies) applied at step 610, apply to a device type of the wireless communication device. For example, while the wireless communication node may generally prohibit connections within certain frequencies, between the wireless communication node and a wireless communication device having a two receiver MIMO configuration, the wireless communication node may permit such connections where the wireless communication device is an XR device. The wireless communication node may determine that the wireless communication device is an XR device, based on the capability information, the subscriber profile, etc. Where, at step 612, the wireless communication node determines that no exceptions apply (e.g., the wireless communication device is a two receiver non-XR device, such as legacy smart phone type UE), the method 600 may proceed to step 614, where the wireless communication node may deny the connection. The method 600 may then proceed back to step 602, where the wireless communication device 602 attempts to establish a connection on a different channel within a permitted frequency band. Where, at step 612, the wireless communication node determines that an exception applies, the method 600 may proceed to step 616.

At step 616, the wireless communication node and wireless communication device may establish the connection. In some embodiments, the wireless communication device and wireless communication node may establish the connection on the channel corresponding to the frequency (e.g., within the frequency band). In some embodiments, the wireless communication device may receive an indication which indicates acceptance of the connection to be established on the channel within the frequency band. For example, the wireless communication node may transmit the indication (e.g., as a connection acceptance message), responsive to determining that the exception applies to the wireless communication device. The wireless communication device may receive the indication responsive to the signal (e.g., transmitted at step 606) indicating the wireless communication device is an XR device (e.g., and thus the exception applies at step 612). The wireless communication device may receive traffic from (e.g., and transmit/push traffic to) the wireless communication node on the channel within the frequency band responsive to establishing the connection on the channel.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method, comprising:

transmitting, by a wireless communication device, to a wireless communication node, a signal indicating a device type of the wireless communication device as a two receiver extended reality (XR) device, the signal comprising a service profile identifier (SPID) indicating the device type as a two receiver XR device; and establishing, by the wireless communication device, a connection with the wireless communication node, the connection established according to a radio access technology frequency selection priority (RFSP) parameter, the connection established on a channel within a frequency band between 2.5 gigahertz (GHz) and 5 GHz, according to information of the device type indicated in the SPID of the signal.

2. The method of claim 1, further comprising receiving, by the wireless communication device, from the wireless communication node, traffic on the channel within the frequency band.

3. The method of claim 1, further comprising:

receiving, by the wireless communication device from the wireless communication node, an indication which indicates acceptance of the connection to be established on the channel within the frequency band.

4. The method of claim 3, wherein the wireless communication device receives the indication, according to the signal indicating that the wireless communication device comprises an XR device.

5. The method of claim 1, wherein the signal comprises device capability information indicating the device type of the wireless communication device.

6. The method of claim 5, wherein the device capability information further includes a number of layers of multiple input multiple output (MIMO) operation.

7. The method of claim 1, wherein the signal includes information corresponding to the wireless communication device accessible via a home subscriber server (HSS) or user data management (UDM).

8. The method of claim 7, wherein the information comprises subscription data, and wherein the wireless communication node determines that the wireless communication device is an XR device, according to the subscription data of the HSS or UDM corresponding to the wireless communication device.

9. A wireless communication device, comprising:

a wireless transceiver configured to:

transmit, to a wireless communication node, a signal indicating a device type of the wireless communication device as a two receiver extended reality (XR) device, the signal comprising a service profile identifier (SPID) indicating the device type as a two receiver XR device; and establish a connection with the wireless communication node, the connection established according to a radio access technology frequency selection priority (RFSP) parameter, the connection established on a channel within a frequency band between 2.5 gigahertz (GHz) and 5 GHz, according to information of the signal.

10. The wireless communication device of claim 9, wherein the wireless transceiver is further configured to receive, from the wireless communication node, traffic on the channel within the frequency band.

11. The wireless communication device of claim 9, wherein the wireless transceiver is further configured to:

receive, from the wireless communication node, an indication which indicates acceptance of the connection to be established on the channel within the frequency band.

12. The wireless communication device of claim 11, wherein the wireless communication device receives the indication, according to the signal indicating that the wireless communication device comprises an XR device.

13. The wireless communication device of claim 9, wherein the signal comprises device capability information indicating the device type of the wireless communication device.

14. The wireless communication device of claim 13, wherein the device capability information further includes a number of layers of multiple input multiple output (MIMO) operation.

15. The wireless communication device of claim 9, wherein the signal includes information corresponding to the wireless communication device accessible via a home subscriber server (HSS) or user data management (UDM).

16. The wireless communication device of claim 15, wherein the information comprises subscription data, and wherein the wireless communication node determines that the wireless communication device is an XR device, according to the subscription data of the HSS or UDM corresponding to the wireless communication device.

17. A wireless communication node, comprising:

a wireless transceiver configured to:

receive, from a wireless communication device, a signal indicating a device type of the wireless communication device as an extended reality (XR) device, the signal comprising a service profile identifier (SPID) indicating the device type as a two receiver XR device; and establish a connection with the wireless communication node, the connection established according to a radio access technology frequency selection priority (RESP) parameter, the connection established on a channel within a frequency band between 2.5 gigahertz (GHz) and 5 GHz, according to information included in the signal.

18. The wireless communication node of claim 17, wherein the signal comprises device capability information indicating at least one of the device type of the wireless communication device or a number of layers of multiple input multiple output (MIMO) operation of the wireless transceiver.

* * * * *